United States Patent
Lorincz

[11] Patent Number: 6,156,991
[45] Date of Patent: Dec. 5, 2000

[54] NON-PLANAR ORBITAL WELDER

[75] Inventor: Thomas Andrew Lorincz, Hollister, Calif.

[73] Assignee: Therma Corporation, Inc., San Jose, Calif.

[21] Appl. No.: 09/129,598

[22] Filed: Aug. 5, 1998

[51] Int. Cl.[7] .................................................. B23K 9/12
[52] U.S. Cl. .................................. 219/60 A; 219/125.11; 219/130.01
[58] Field of Search ................................. 219/60 A, 61, 219/124.34, 125.11, 130.01

[56] References Cited

U.S. PATENT DOCUMENTS

| | | | |
|---|---|---|---|
| 3,534,199 | 10/1970 | Downey et al. | 219/60 A |
| 3,797,813 | 3/1974 | Roesel | 228/29 |
| 4,438,600 | 3/1984 | Berbakov | 219/125.11 |
| 4,581,518 | 4/1986 | Takahashi et al. | 219/60 A |
| 4,629,853 | 12/1986 | Yttergren et al. | 219/60 A |
| 5,107,090 | 4/1992 | Caillet et al. | 219/60 A |
| 5,220,144 | 6/1993 | Jusionis | 219/60 A |
| 5,310,982 | 5/1994 | Jusionis | 219/61 |
| 5,837,966 | 11/1998 | Timmons, Jr. | 219/60 A |

*Primary Examiner*—Clifford C. Shaw
*Attorney, Agent, or Firm*—Henneman & Saunders; Larry E. Henneman, Jr.

[57] ABSTRACT

An orbital welder includes a weld tip, a rotational controller, and a translational controller. The rotational controller causes the weld tip to rotate about an axis passing through the tube to be welded. As the weld tip rotates about the axis, the translational controller causes the weld tip to move longitudinally with respect to the axis, forming non-planar orbital welds. In one embodiment, the translational controller includes a rotor disposed to rotate about the axis. The translational controller further includes a carrier that is slidably attached to the rotor, and the weld tip is fixed to the carrier. As the rotor rotates about the axis, the carrier moves longitudinally with respect to the axis, such that the weld tip follows a non-planar orbital weld pattern. In a particular embodiment, a portion of the carrier is biased against a surface a cam block. The surface of the cam block is contoured to displace the carrier longitudinally with respect to the axis of rotation as the rotor rotates about the axis.

37 Claims, 14 Drawing Sheets

NON-PLANAR ORBITAL WELDER

BACKGROUND OF THE INVENTION

1. Field of the Invention

This invention relates generally to orbital welders, and more particularly to a novel orbital welder facilitating easier tube alignment and capable of forming non-planar welds.

2. Description of the Background Art

Orbital welders are widely used in the construction of fluid handling systems, for example semiconductor processing equipment. Known orbital welders join metal tubes in an end-to-end fashion by forming a flat, circular weld around the circumference of the tube's open end. One problem encountered by conventional orbital welders is that the ends of the tubes which are to be joined must be carefully aligned prior to performing the welding operation. Additionally, because known orbital welders are limited to forming flat, circular welds (i.e., a circular weld lying in a single plane), special tube preparation is required to weld a cross or a tee ("T") joint.

FIG. 1 is a top plan view of a typical orbital welder 100, which includes an insulating housing 102, tube clamps 104 and 106, a rotor 108, a weld tip 110, and a rotation and voltage controller 112. Clamps 104 and 106 hold tubes 114 and 116, respectively, in position for welding, and are maintained at a common voltage (e.g., ground) and in electrical contact with tubes 114 and 116. Rotor 108 is disposed within housing 102 so as to be rotatable about an axis 118 passing through the center of the open ends of tubes 114 and 116. Housing 102 provides electrical insulation between rotor 108 and clamps 104 and 106. Rotation and voltage controller 112 functions to rotate rotor 108 within housing 102, and to apply a voltage, via rotor 108, to attached weld tip 110.

FIG. 2 shows a cross-sectional view of orbital welder 100. As controller 112 rotates rotor 108 about axis 118 and applies a high voltage to weld tip 110, an arc weld 202 is formed between the open ends of tubes 114 and 116. Because clamps 104 and 106 are held at the common voltage, they must be displaced a safe distance from weld tip 110, so as not to generate an arc therebetween. The distance between clamps 104 and 106 and the open ends of tubes 114 and 116 makes alignment of the open ends of tubes 114 and 116 more difficult. Moreover, the interior chambers of known orbital welders are dark, and, therefore, visual confirmation of proper alignment is difficult.

FIG. 3 is a cross-sectional view of an orbital welder 300 capable of forming a flat "T" weld. Orbital welder 300 includes an insulating housing 302, a tube clamp 304, a "T" fitting clamp 306, a rotor 308, a weld tip 310, and a rotation and voltage controller 312.

Orbital welder 300 functions similarly to orbital welder 100. Clamps 304 and 306 hold a tube 314 and a T-fitting 316 in position and at a common voltage. Rotation and voltage controller 312 causes rotor 312 to rotate about an axis 318, and applies a high voltage, via rotor 308, to weld tip 310. As rotor 308 rotates about axis 318, a weld 320 is formed between the open ends of tube 314 and T-fitting 316.

FIG. 4 is a perspective view of T-fitting 316. In order to make T-fitting 316 from a standard piece of tube stock 402, an opening 404 is first cut or ground into the tube stock 402. Next, an extrusion process is required to draw the tube material surrounding opening 404 into an extended portion 406 defining a flat circular opening 408. Because the extrusion process is relatively complex, workers cannot weld T-joints quickly and easily on job sites, from standard tube stock. Additionally, for commonly used 0.25 in. O.D. tubing, the extrusion process is generally limited to tubes with a wall thickness of 0.028 in. or less, and is therefore unavailable for the preferred 0.035 in. walled tubing.

What is need is an orbital welder capable of welding T-joints and cross-joints from standard tube stock. What is also needed is an orbital welder which facilitates easy alignment of the tube pieces which are to be welded. What is also needed is an orbital welder with that facilitates visual confirmation of proper alignment.

SUMMARY

A novel orbital welder capable of forming non-planar orbital welds is described. The use of non-planar orbital welds facilitates the construction of various tube joints, including T-joints, cross-joints, and end-to-end joints, form standard tube stock by workers in the field.

One embodiment includes a weld tip, a rotational controller, and a translational controller. The rotational controller causes the weld tip to rotate about an axis passing through the tube to be welded. As the weld tip rotates about the axis, the translational controller causes the weld tip to move longitudinally with respect to the axis. Thus, non-planar orbital welds can be formed.

In a particular embodiment, the translational controller includes a rotor which is slidably disposed in an insulating body, and the weld tip is fixed directly to the rotor. As the rotor rotates about the axis, the translational controller causes the rotor to move longitudinally with respect to the axis of rotation, such that the weld tip follows a non-planar weld pattern.

In another particular embodiment, the rotational controller includes a rotor disposed to rotate about the axis, but remains within the plane of rotation. The translational controller includes a carrier that is slidably attached to the rotor, and the weld tip is fixed to the carrier. As the rotor rotates about the axis, the carrier moves longitudinally with respect to the axis, such that the weld tip follows a non-planar weld pattern, In a more particular embodiment, a portion of the carrier is biased against a surface of a cam block, and optionally includes a wheel for reducing the friction between the carrier and the cam block. The surface of the cam block is contoured to displace the carrier longitudinally with respect to the axis of rotation as the rotor rotates about the axis. Alternatively, the surface of the cam block is flat, and the cam block is displaced longitudinally as the rotor rotates about the axis of rotation.

In an alternate embodiment, the translational controller includes a wall with a groove that defines the desired weld pattern. A guide pin extends from the carrier into the groove. As the rotor rotates about the axis of rotation, the pin follows the groove, moving the carrier longitudinally with respect to the axis of rotation.

Another embodiment, particularly suited for welding cross-joints includes two weld tips, two rotational controllers, and two translational controllers. In a particular embodiment, each translational controller includes a rotor which rotates about an axis of rotation, and which moves longitudinally with respect to the axis. Each weld tip is fixed to one of the rotors, and, therefore, moves along a non-planar circular path. In an alternate embodiment, each translational controller includes a rotor which rotates about an axis, but which is fixed in the plane of rotation. Each weld tip is fixed to separate carrier which is slidably attached to a respective one of the rotors. Each of the carriers is biased against an associated one of two cam blocks. As the rotors rotate about the axes of rotation, the cam blocks displace the carriers longitudinally. The attached weld tips follow non-planar orbital weld patterns. Optionally, a single rotational controller controls both rotors.

Any of the described embodiments may include an optional light source for illuminating the interior chamber of the orbital welder. In one embodiment, the body of the orbital welder includes a light conducting portion for transmitting light from the light source to the interior chamber. In a more particular embodiment, the light conducting portion is formed as a layer of the body of the orbital welder, and the light source is disposed in an opening in, or along the edge of, the light conducting layer. Optionally, the light source is disposed within the interior chamber of the welder. Types of light sources used may include, but are not limited to, light-emitting diodes, incandescent bulbs, and optical fibers transmitting light from a remote source. A switch, disposed on the exterior surface of the body or in an external controller, controls the operation of the light source.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing an orbital welder capable of forming non-planar welds. Specifically, the present invention describes an orbital welder capable of making tube joints from standard stock using orbital welds which are not restricted to a single plane. Additionally, non-planar tube ends that can be welded according to the present invention facilitate easy alignment of the tube ends. In the following description, numerous specific details are set forth (e.g., particular weld patterns and control algorithms) in order to provide a thorough understanding of the invention. Those skilled in the art will recognize, however, that the invention may be practiced apart from these specific details. In other instances, well known details of orbital welder design have been omitted, so as not to unnecessarily obscure the present invention.

Figure 1:
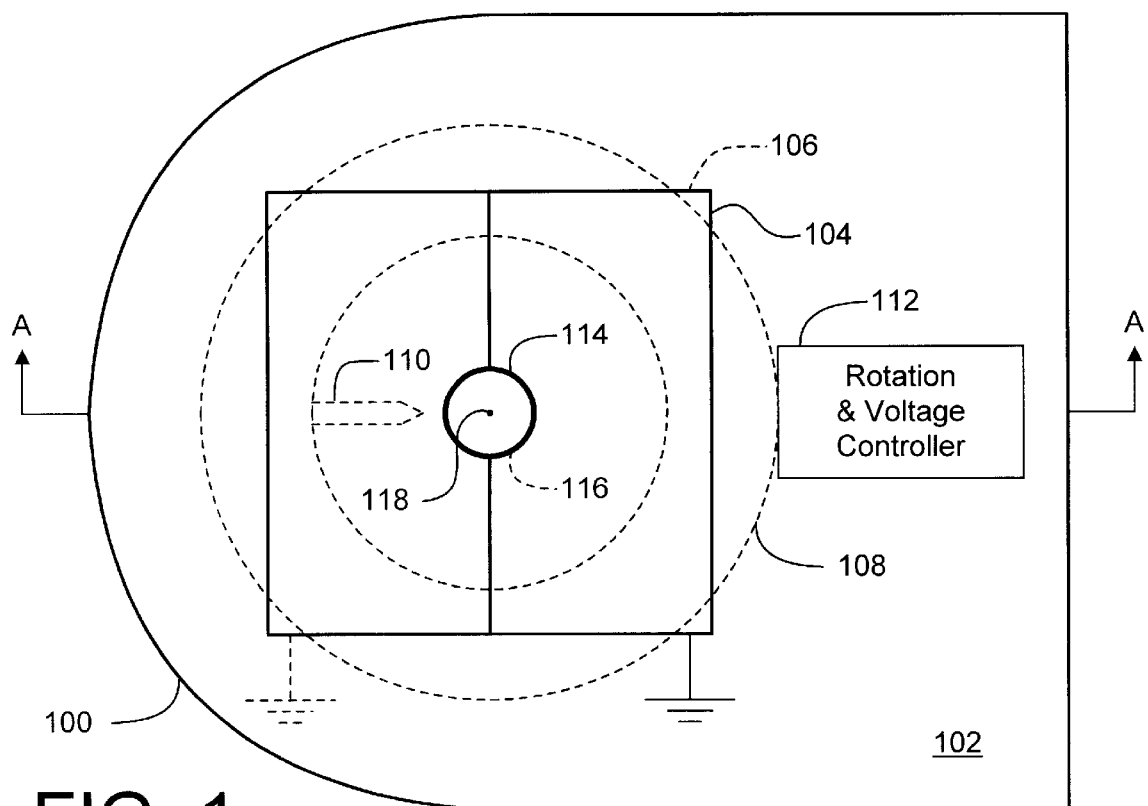
FIG. 1 is a top plan view of a prior art orbital welder.
Figure 2:
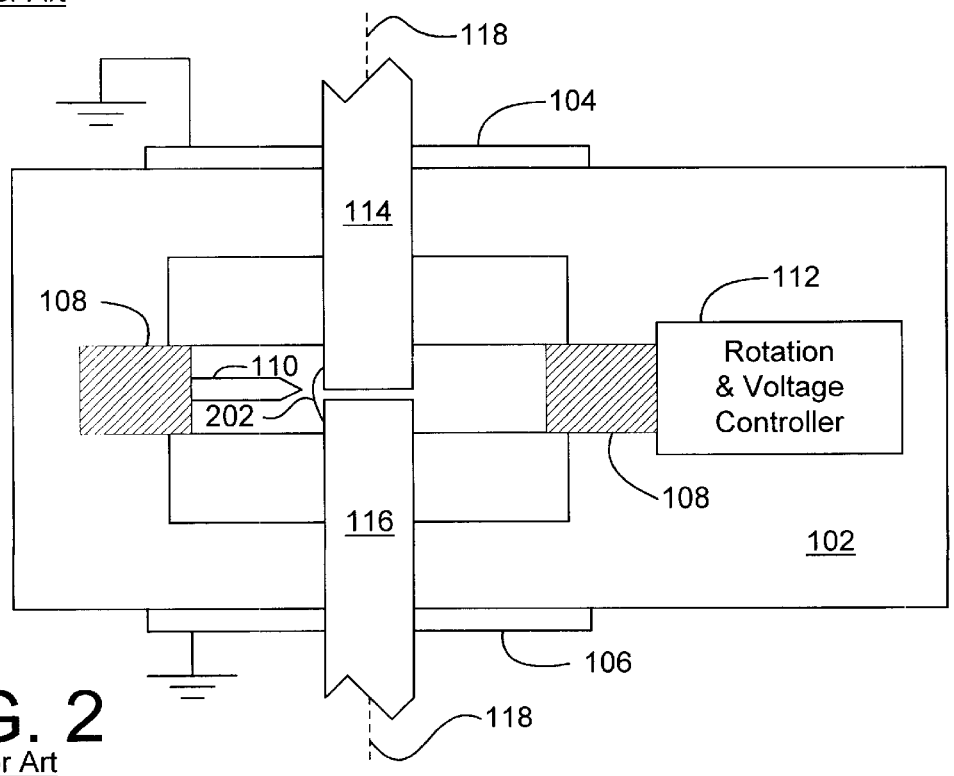
FIG. 2 is a cross-sectional view of the orbital welder of FIG. 1, taken along line A—A.
Figure 3:
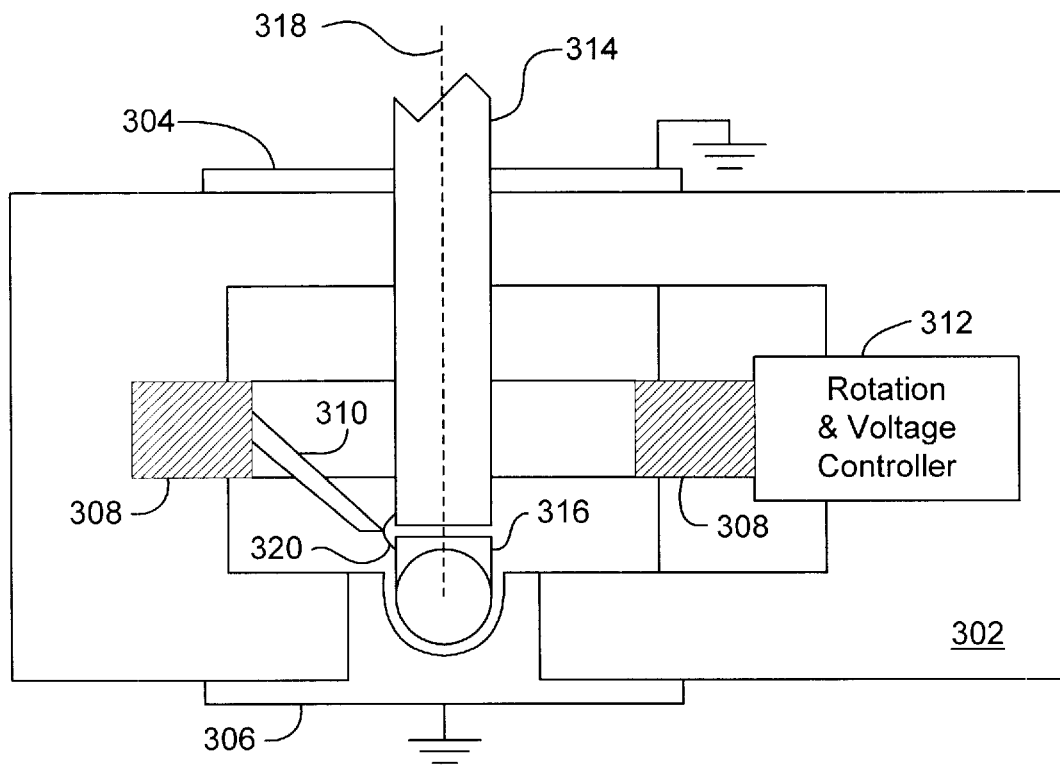
FIG. 3 is a cross-sectional view of a prior art orbital welder for forming a flat T-weld.
Figure 4:
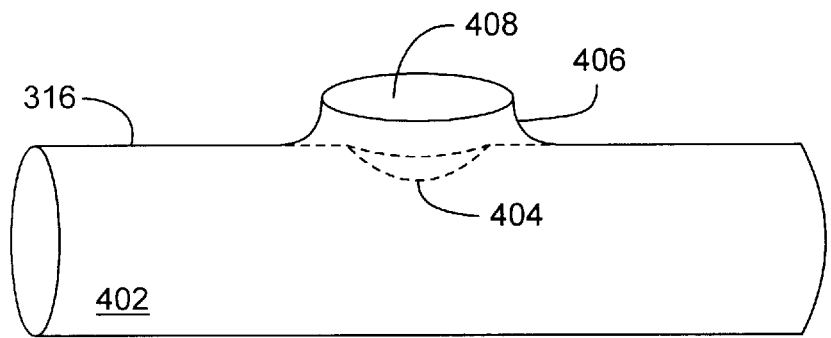
FIG. 4 shows a tube with an extruded portion for accommodating a flat T-weld.
Figure 5:
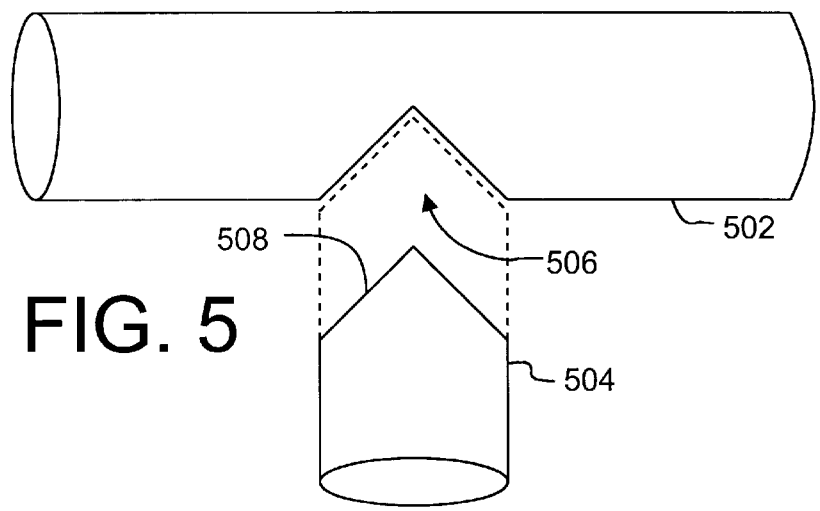
FIG. 5 shows two tubes shaped to be joined by a notched T-weld.

FIG. 5 shows two pieces of standard tube stock 502 and 504 shaped to form a notched T-joint. In particular, tube 502 has an angled notch 506 cut or ground into its lateral wall, and tube 504 has an end 508 cut or ground to a point. Notch 506 and end 508 can be easily formed by workers in the field using methods well known to those skilled in the art, for example grinding with a guide.

Notch 506 and end 508 are formed as a mated pair, so that when end 508 is inserted into notch 506, a smooth joint is formed. The mated characteristics of notch 506 and end 508 facilitate the easy alignment of tubes 502 and 504 for welding. In a particular embodiment, notch 506 and end 508 are both formed at a 45 degree angle. Those skilled in the art will recognize, however, that any other useful or advantageous pattern may be employed, so long as the tubes form a well mated joint.

Figure 6:
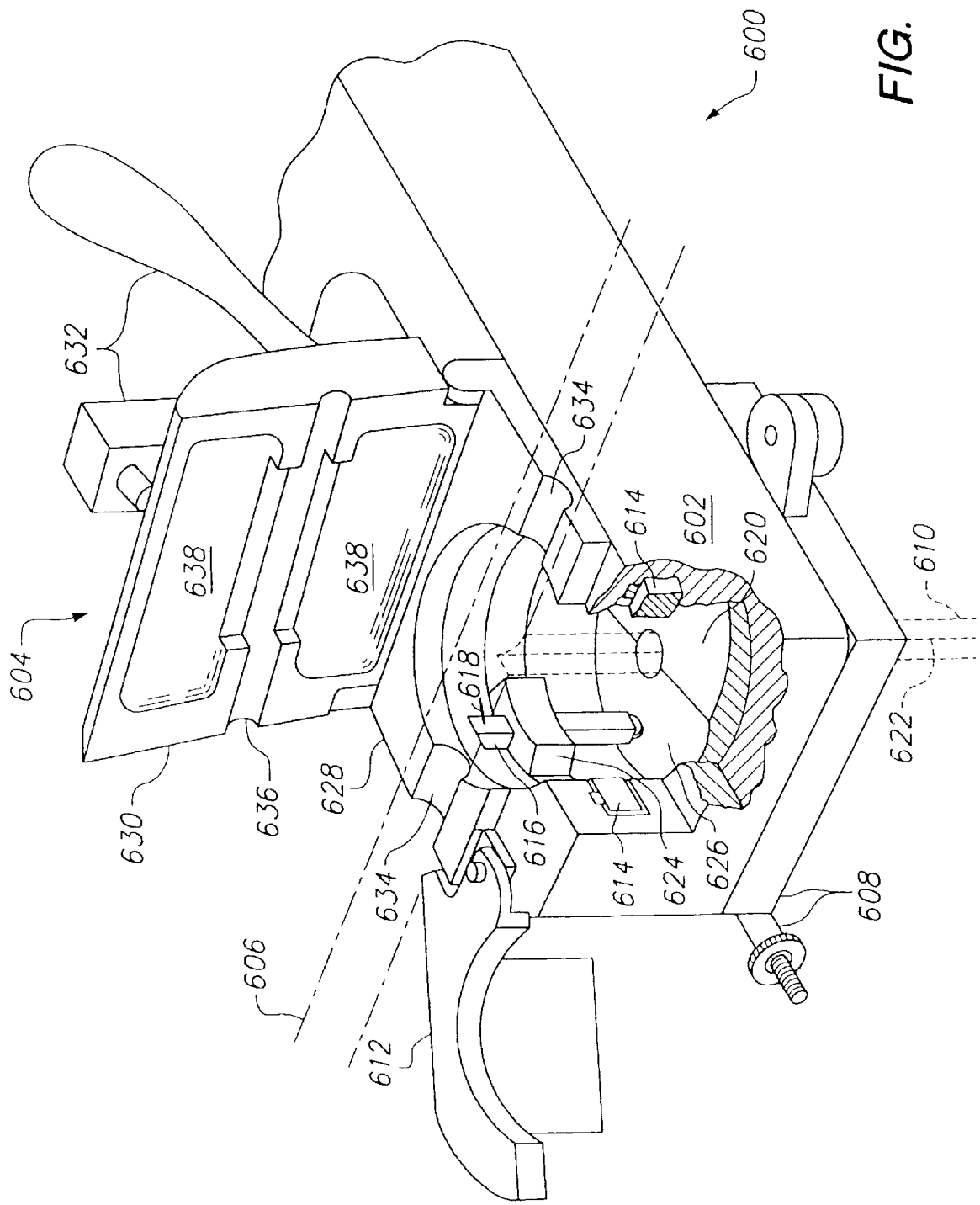
FIG. 6 is a perspective view of an orbital welder (open) according to the present invention.

FIG. 6 is a partially cut away, perspective view of an orbital welder 600, capable of forming a weld along the joint formed between tubes 502 and 504 of FIG. 5, in accordance with the present invention. Orbital welder 600 includes an insulating body 602, a run tube clamp 604 for clamping a run tube 606 (shown in phantom lines), a branch tube clamp 608 for clamping a branch tube 610 (shown in phantom lines), a hinged window 612, a rotor 614, a carrier 616, a weld tip 618, and a cam block 620.

Hinged window 612 opens to provide access to the interior of orbital welder 600, and, when closed, provides visual access to monitor the welding process and tube alignment. Rotor 614 is disposed in an annular channel formed within insulating body 602, so as to facilitate rotation about a longitudinal axis 622 of branch tube 610. Although not shown in FIG. 6, insulating body 602 may be formed from several detachable layers to facilitate easy installation and removal of rotor 614 or other components of orbital welder 600. Carrier 616 is slidably mounted to rotor 614, by retaining member 624, and is biased against cam block 620. As rotor 614 rotates about axis 622, carrier 616 rides along a top surface 626 of cam block 620, moving longitudinally (up and down) with respect to axis 622. Weld tip 618 is fixed to carrier 616 and extends toward the joint formed between run tube 606 and branch tube 610. The contour of surface 626 of cam block 620 corresponds to the desired weld pattern (i.e., the joint between run tube 606 and branch tube 610). Thus, as rotor 614 rotates about axis 622, weld tip 618 tracks the joint between run tube 606 and branch tube 610.

Run tube clamp 604 includes a base plate 628, a cover plate 630, and a latch lever 632. Base plate 628 includes a groove 634 for receiving and positioning run tube 606. Cover plate 630 also includes a groove to accommodate run tube 606 when clamp 604 is closed. Additionally, cover plate 630 includes a recessed portion 638 to accommodate the longitudinal movement of carrier 616 and weld tip 618.

Figure 7:
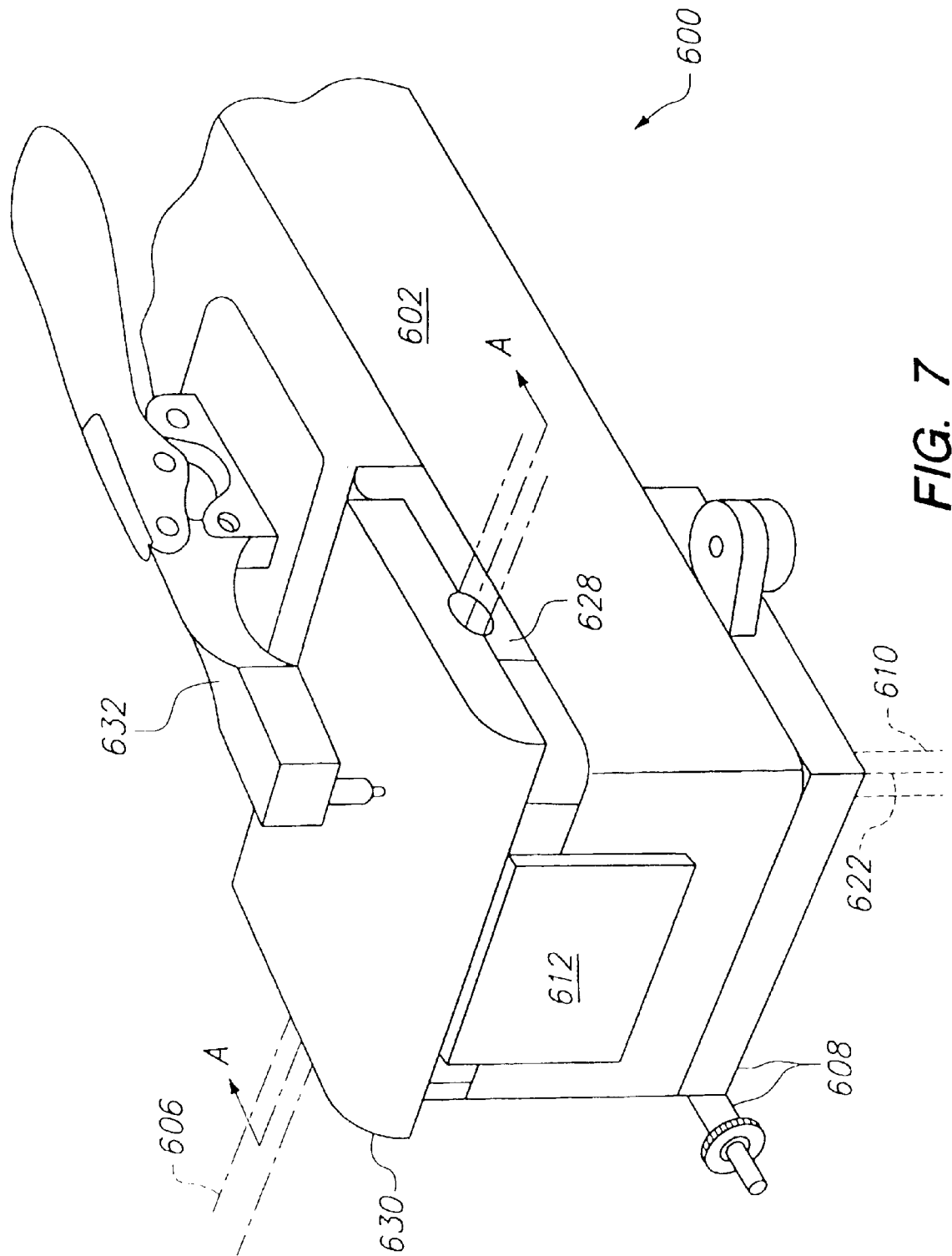
FIG. 7 is a perspective view of the orbital welder (closed) of FIG. 6.

FIG. 7 is a perspective view of orbital welder 600 with run tube clamp 604 and hinged window 612 in a closed position. In the closed position, clamps 604 and 608 hold run tube 606 and branch tube 610, respectively, in place for welding. Additionally, clamps 604 and 608 are constructed from an electrically conductive material (e.g., stainless steel), and are coupled to a common voltage source (e.g., ground) to maintain run tube 606 and branch tube 610 at the common voltage.

Figure 8:
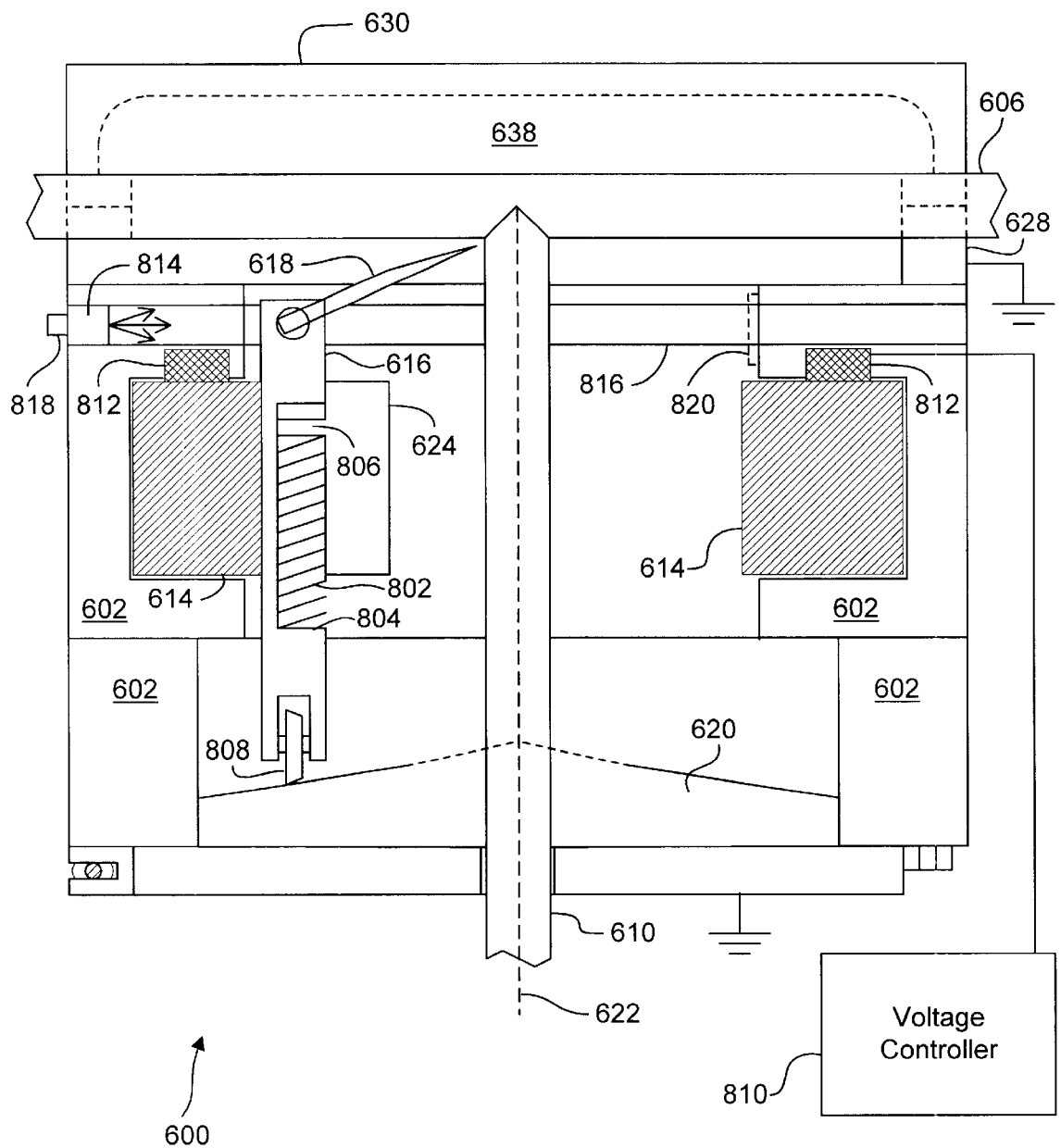
FIG. 8 is a cross-sectional view of the orbital welder of FIG. 7 taken along line A—A.

FIG. 8 is a cross-sectional view of orbital welder 600 taken along line A—A of FIG. 7, showing the internal components of orbital welder 600 in greater detail. Carrier 616 is notched to receive a compressed spring 802 which pushes against a bottom portion 804 of carrier 616 and against a tab portion 806 of retaining member 624, thus biasing carrier 616 against cam block 620. Carrier 616 further includes a wheel 808 for reducing the friction between carrier 616 and cam block 620 as rotor 614 rotates about axis 622. Those skilled in the art will understand that other friction reducing means may be employed instead of a wheel. For example, friction between cam block 620 and carrier 616 may be reduced to an acceptable level by forming a polished skip plate on the lower portion of carrier 616 and forming the cam block from a low friction material, for example TEFLON®.

A voltage controller 810 provides power to weld tip 618 by asserting a high voltage, via a brush contact 812, rotor 614, and carrier 616, onto weld tip 618. An electrical arc between weld tip 618 and tubes 606 and 610 forms a weld between tubes 606 and 610 at the notched joint.

Orbital welder 600 further includes a light source 814 disposed in an opening in a transparent annular layer 816 of insulating body 602. Responsive to an external control switch 818, light source 814 emits light into layer 816. Optionally, a plurality of light sources similar to light source 814 may be disposed within openings in transparent layer 816. The external edge of layer 816 is coated with a reflective material, and the interior edge of layer 816 is transparent, such that layer 816 transmits the emitted light into the interior of welder 600. Switch 818 is disposed on the outside of welder 600 so as to be accessible to a user, and selectively applies electrical power (source not shown) to light source 814. Optionally, control switch 818 is disposed remotely (e.g., in an external control unit).

In a particular embodiment, light source 814 is an incandescent bulb. Those skilled in the art will recognize, however, that other types of light sources (e.g., light-emitting diodes, optical fibers, etc.) may be employed. In an alternate embodiment, one or more light sources 820 are disposed on an interior wall of welder 600, and emit light directly into the interior of welder 600. In another alternate embodiment, light source 814 is disposed adjacent an external edge of layer 816, and emits light into layer 816 through the external edge.

Figure 9:
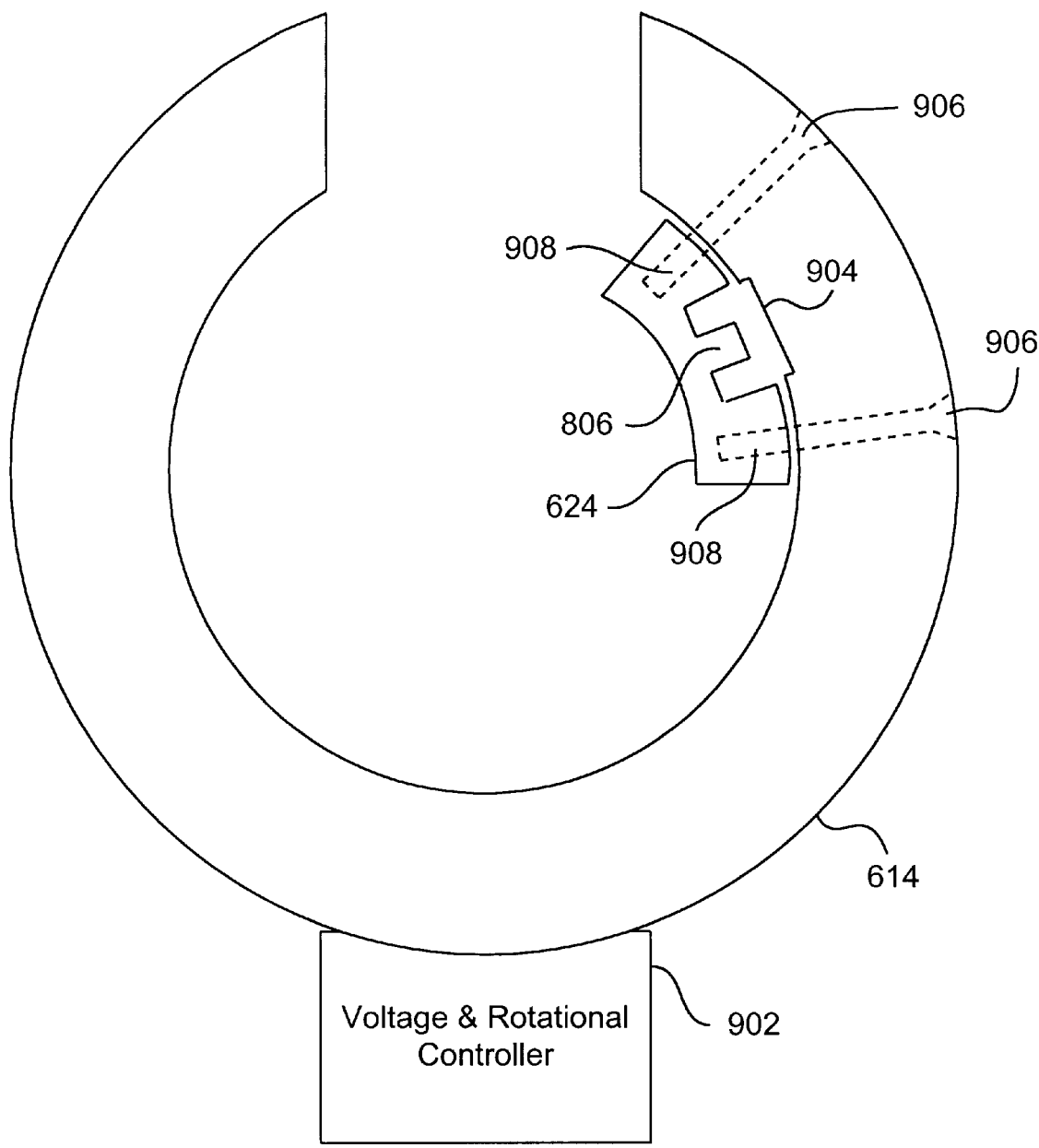
FIG. 9 is a top plan view of a rotor shown in FIG. 6.

FIG. 9 is a top plan view of rotor 614, retaining member 624, and voltage and rotational controller 902, which include voltage controller 810 (not shown). Rotor 614 includes a carrier receiving notch 904 and a pair of mounting holes 906. Carrier 616 (not shown in FIG. 9) is held in carrier receiving notch 904 by retaining member 624, which includes a pair of tapped holes 908. Retaining member 624 is held to rotor 614 by a pair of bolts (not shown) which pass through mounting holes 906 and engage tapped holes 908. When attached, carrier 616 is free to slide up and down in carrier receiving notch 904, and is biased in the downward direction due to spring 802 (not shown) pressing against tab portion 806 of retaining member 624.

Voltage and rotational controller 902 controls the rotation of rotor 614 and the voltage applied to weld tip 618, via rotor 614 and carrier 616. Voltage and rotational controller 902 is shown as a single block in FIG. 9, because the details of voltage and rotation control in orbital welders is well known to those skilled in the art. For example, in one embodiment voltage and rotational controller 902 is equivalent to the control and driving mechanisms of an orbital weld head model 9AF-750 and a power supply mode 207, both sold by ARC MACHINES, INC., of Pacoima, Calif. Note that in this particular embodiment, one portion of voltage and rotational controller 902 (e.g., a gear train) is embodied in the orbital weld head, and a second portion (e.g., voltage controller 810) of voltage and rotational controller 902 is embodied in a remote power supply, notwithstanding the fact that voltage and rotational controller 902 is shown as a single block in FIG. 9.

Figure 10A:
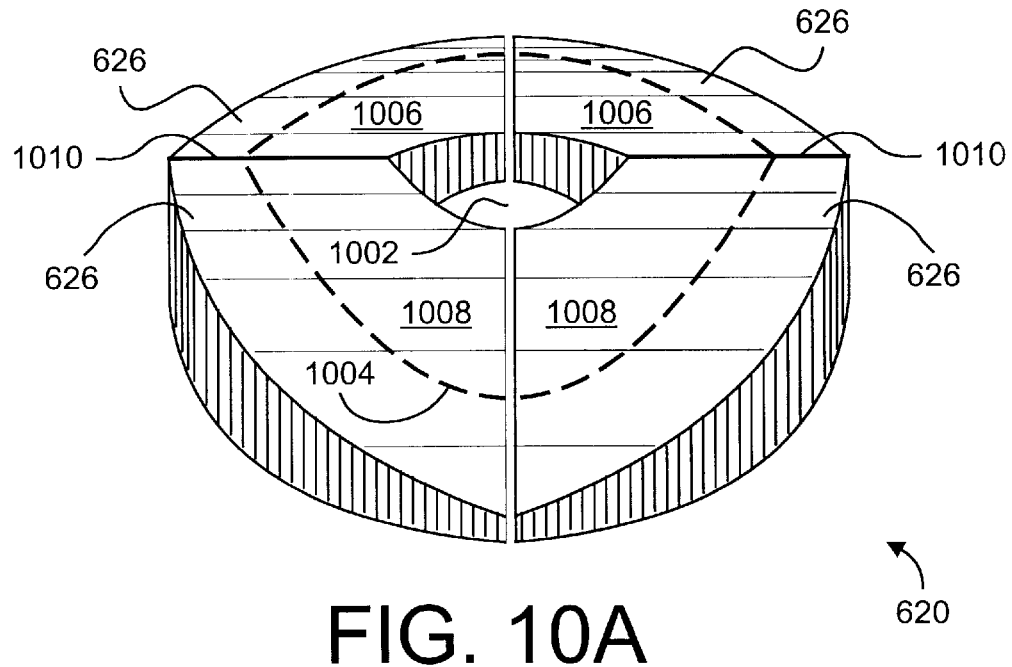
FIG. 10A is a perspective view of a cam block shown in FIG. 6.

FIG. 10A is a perspective view of cam block 620. In this particular embodiment, cam block 620 is made of two pieces of insulating material such as fiberglass, but those skilled in the art will understand that it could be formed as a single piece. Cam block 620 defines a hole 1002 passing through its center, through which branch tube 610 passes when in the welding position.

The contour of surface 626 of cam block 620 defines the weld pattern followed by weld tip 618 as carrier 616 traverses a circular path 1004 on surface 626. In this particular embodiment, the contour of surface 626 corresponds to a notched-T weld pattern. Specifically, surface 626 includes a first planar portion 1006 and a second planar portion 1008, intersecting at a crest 1010. Those skilled in the art will understand that surface 626 may be shaped to generate any desirable weld pattern. For example, a cam block having a single inclined planar surface can be used to generate an oblique end-to-end weld pattern.

Figure 10B:
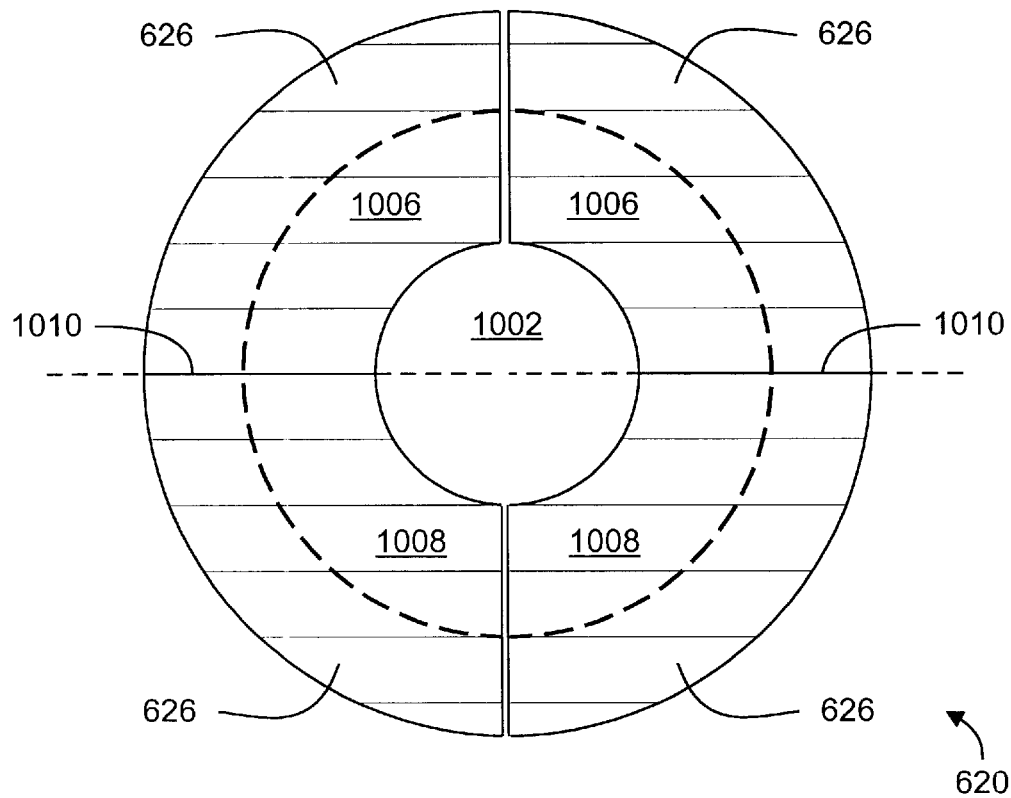
FIG. 10B is a top plan view of the cam block shown in FIG. 10A.

FIG. 10B is a top plan view of cam block 620. The plurality of equally spaced horizontal lines are elevational lines, showing that surfaces 1006 and 1008 are planar surfaces meeting at crest 1010.

Figure 11:
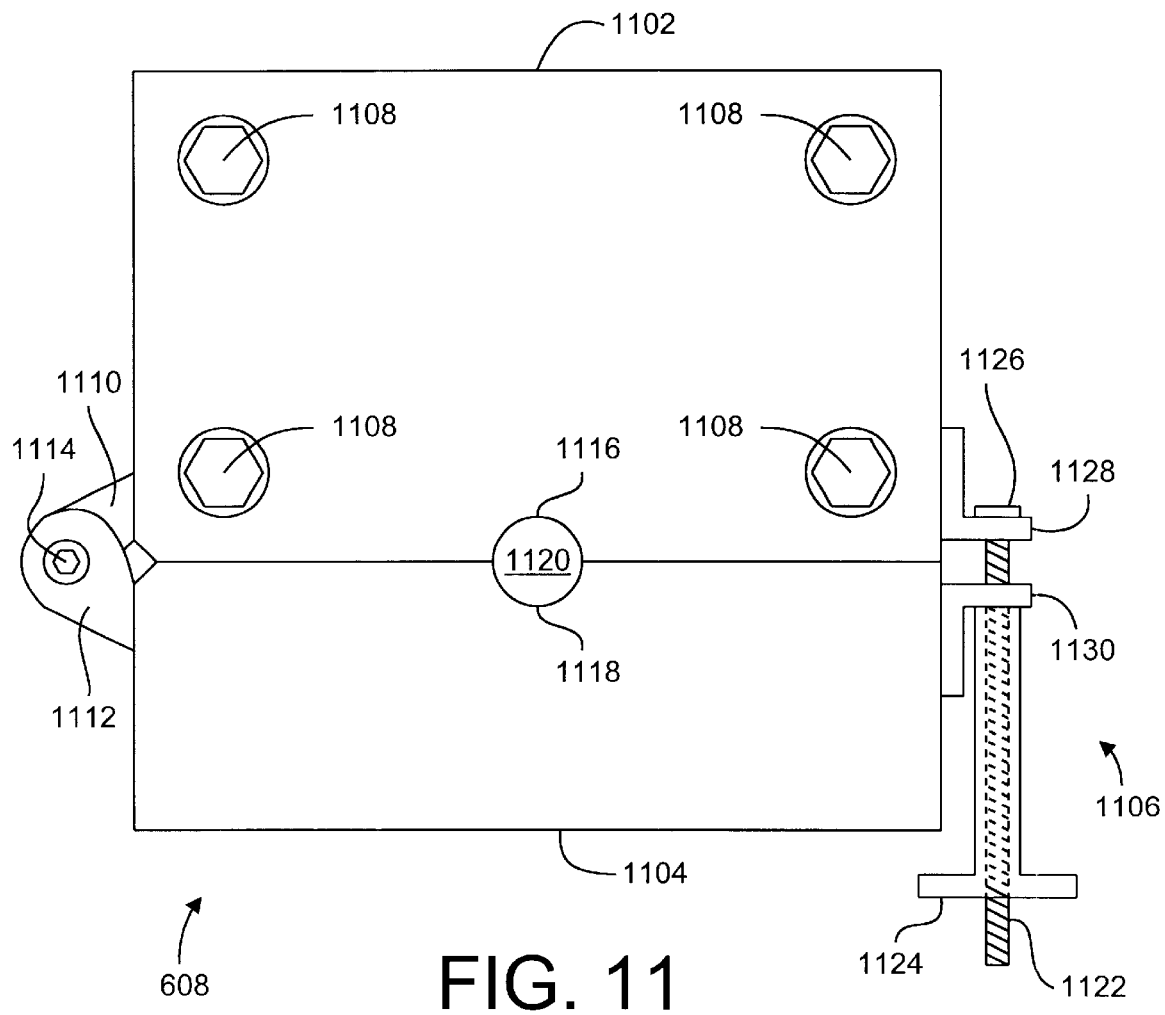
FIG. 11 is a bottom plan view of a tube clamp shown in FIG. 6.

FIG. 11 shows a bottom plan view of branch tube clamp 608, which includes a stationary portion 1102, a moveable portion 1004, and a locking portion 1106. Stationary portion 1102 is fixed to insulating body 602 with four hex head bolts 1108, and includes a hinge portion 1110. Moveable portion 1104 also includes a hinge portion 1112, and is pivotally connected to stationary portion 1102 by a hinge pin 1114.

Stationary portion 1102 and moveable portion 1104 include semi-circular edges 1116 and 1118, respectively, which together form a circular opening 1120 for receiving branch tube 610. Locking portion 1106 includes a male threaded bolt 1122 and a female threaded handle 1124. A head 1126 of bolt 1122 seats against a bracket 1128 fixed to stationary portion 1102, and handle 1124 seats against a bracket 1130 fixed to movable portion 1104. When handle 1124 is rotated in one direction, it tightens movable portion 1104 against stationary portion 1102, firmly clamping branch tube 610 is opening 1120. When handle 1124 is rotated in the opposite direction, movable portion 1104 can move away from stationary portion 1102, releasing the clamping grip on branch tube 610.

One embodiment of the present invention was constructed by modifying an orbital weld head mode 9AF-750 sold by ARC MACHINES, INC., of Pacoima, Calif., in accordance with FIGS. 6–11. T-joints were successfully welded from 0.25" stainless steel tube stock by driving the modified orbital weld head with a power supply model 207 sold by ARC MACHINES, INC., of Pacoima, Calif., according to the following drive scheme:

| # | OD | WALL | TYPE | MAT | QTY |
|---|---|---|---|---|---|
| 046 | 0.250 | .035 | SP | SS | 0023 |
| PRE-PURGE-POST | | UP-SLOPE-DOWN | | ROT--DLY | |
| 7 | 10 | 0.0 | 2.0 | CW | 1.8 |
| LVL | PULSE | | ROT | PRI--RPM--BCK | |
| 1 | ON | | CONT | 6.00 | 0.00 |
| | TIME | | PRI-AMP--BCK | PRI-PULSE-BCK | |
| 1 | 3.0 | 42.0 | 20.0 | 0.05 | 0.05 |
| LVL | PULSE | | ROT | PRI--RPM--BCK | |
| 2 | ON | | CONT | 6.00 | 0.00 |
| | TIME | | PRI-AMP--BCK | PRI-PULSE-BCK | |
| 2 | 1.0 | 37.0 | 17.0 | 0.05 | 0.05 |
| LVL | PULSE | | ROT | PRI--RPM--BCK | |
| 3 | ON | | CONT | 6.00 | 0.00 |
| | TIME | | PRI-AMP--BCK | PRI-PULSE-BCK | |
| 3 | 1.0 | 34.0 | 17.0 | 0.05 | 0.05 |
| LVL | PULSE | | ROT | PRI--RPM--BCK | |
| 4 | ON | | CONT | 6.00 | 0.00 |
| | TIME | | PRI-AMP--BCK | PRI-PULSE-BCK | |
| 4 | 1.0 | 40.0 | 19.0 | 0.05 | 0.05 |
| LVL | PULSE | | ROT | PRI--RPM--BCK | |
| 5 | ON | | CONT | 6.00 | 0.00 |
| | TIME | | PRI-AMP--BCK | PRI-PULSE-BCK | |
| 5 | 1.0 | 43.0 | 23.0 | 0.05 | 0.05 |
| LVL | PULSE | | ROT | PRI--RPM--BCK | |
| 6 | ON | | CONT | 6.00 | 0.00 |
| | TIME | | PRI-AMP--BCK | PRI-PULSE-BCK | |
| 6 | 1.0 | 39.0 | 19.0 | 0.05 | 0.05 |
| LVL | PULSE | | ROT | PRI--RPM--BCK | |
| 7 | ON | | CONT | 6.00 | 0.00 |
| | TIME | | PRI-AMP--BCK | PRI-PULSE-BCK | |
| 7 | 1.0 | 33.0 | 16.0 | 0.05 | 0.05 |
| LVL | PULSE | | ROT | PRI--RPM--BCK | |
| 8 | ON | | CONT | 6.00 | 0.00 |
| | TIME | | PRI-AMP--BCK | PRI-PULSE-BCK | |
| 8 | 1.0 | 33.0 | 16.0 | 0.05 | 0.05 |
| LVL | PULSE | | ROT | PRI--RPM--BCK | |
| 9 | ON | | CONT | 6.00 | 0.00 |
| | TIME | | PRI-AMP--BCK | PRI-PULSE-BCK | |
| 9 | 1.0 | 40.0 | 22.0 | 0.05 | 0.05 |
| LVL | PULSE | | ROT | PRI--RPM--BCK | |
| 10 | ON | | CONT | 6.00 | 0.00 |
| | TIME | | PRI-AMP--BCK | PRI-PULSE-BCK | |
| 10 | 3.0 | 39.0 | 19.0 | 0.05 | 0.05 |

Figure 12:
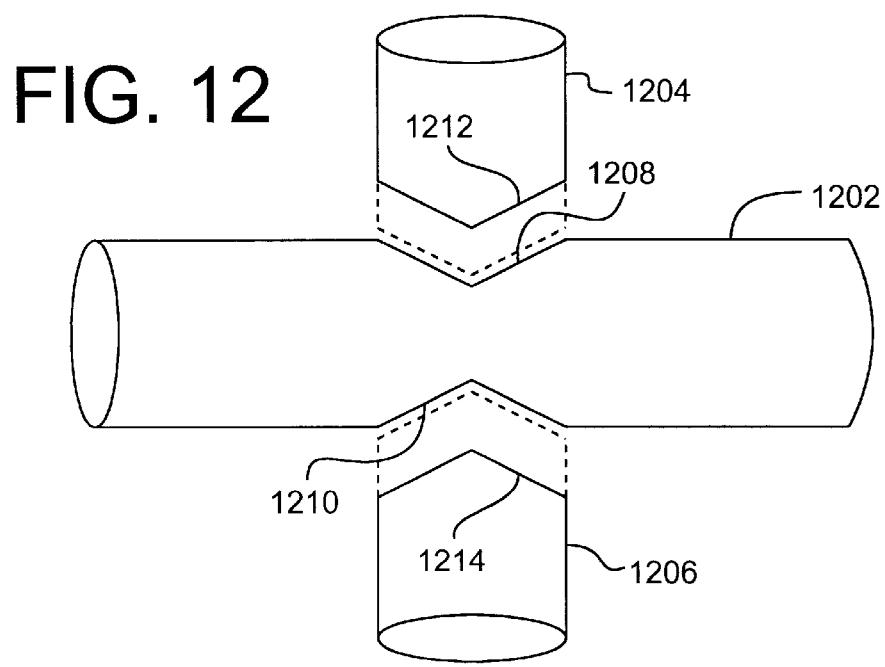
FIG. 12 shows three tubes shaped to be joined by a notched cross weld.

FIG. 12 shows three pieces of standard tube stock 1202, 1204, and 1206, all shaped to form a notched cross-joint when welded together. In particular, tube 1202 has a first angled notch 1208 and a second angled notch 1210 cut or ground into its lateral wall, and tubes 1204 and 1206 have ends 1212 and 1214, respectively, cut or ground to points. Notches 1208 and 1210 and ends 1212 and 1214 can be easily formed by workers in the field using methods well known to those skilled in the art.

Notches 1208 and 1210 and ends 1212 and 1214 are formed as mated pairs, so that when ends 1212 and 1214 are inserted into notches 1208 and 1210, smooth joints are formed. The mated characteristics of notches 1208 and 1210 and ends 1212 and 1214 facilitate the easy alignment of tubes 1202, 1204, and 1206 for welding. In a particular embodiment, notches 1208 and 1210 and ends 1212 and 1214 are all formed at 45 degree angles. Those skilled in the art will recognize, however, that any other useful or advantageous pattern (e.g., a curvilinear pattern) may be employed, so long as the tubes form a well mated joint.

Figure 13:
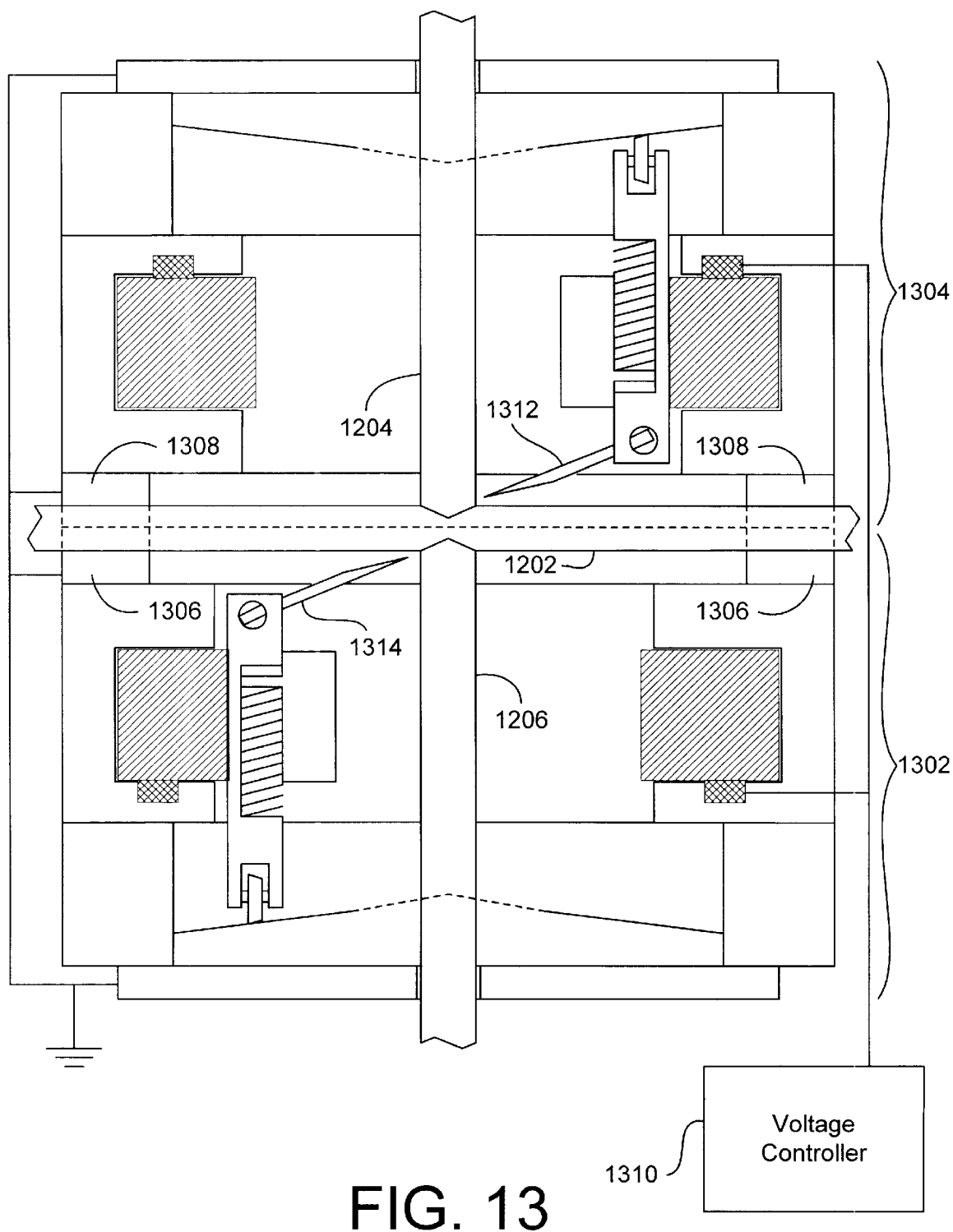
FIG. 13 is a cross-sectional view of an alternate orbital welder for forming a notched cross weld, in accordance with the present invention.

FIG. 13 is a cross-sectional view of an alternate orbital welder 1300 capable of welding a notched cross-joint from the tube pieces shown in FIG. 12. Welder 1300 includes a lower welder 1302 and an upper welder 1304, each of which is substantially identical to welder 600, except that instead of run tube clamp 604, lower welder 1302 and upper welder 1304 include run tube receiving portions 1306 and 1308, respectively. When lower welder 1302 and upper welder 1304 are clamped together (by a hinge and clamp not shown), run tube 1202 is clamped in position for welding. A branch tube clamp 1310 fixed to upper welder 1304, and a branch tube clamp 1312 fixed to lower welder 1302 hold branch tubes 1204 and 1206, respectively, in place for welding.

A voltage controller 1310 provides the power necessary for welding. Those skilled in the art will recognize that voltage controller 1310 is included in a rotational and voltage controller (not shown). Further, those skilled in the art will understand that a single rotational and voltage controller may be employed to drive both lower welder 1302 and upper welder 1304, or optionally, separate controllers may be provided to independently control lower welder 1302 and upper welder 1304. In the case of a single controller, it is advantageous to dispose the weld tip 1312 of the upper welder 1304 directly opposite the weld tip 1314 of the lower welder 1302, to avoid their interfering with each other.

Figure 14:
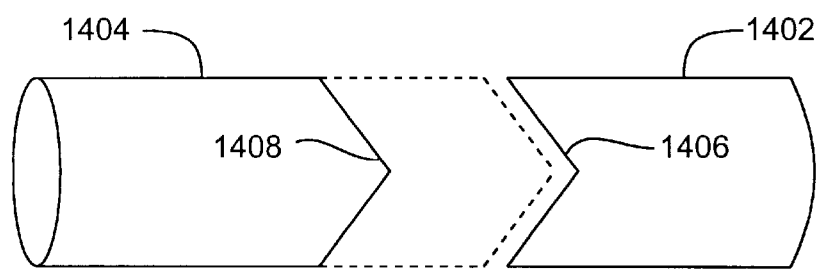
FIG. 14 shows two tubes shaped to be joined by a notched end-to-end weld.

FIG. 14 shows two pieces of standard tube stock 1402 and 1404 shaped to form a notched end-to-end joint. In particular, tube 1402 has an angled notch 1406 cut or ground into its end, and tube 1404 has a point 1408 cut or ground into its end. Notch 1406 and point 1408 can be easily formed by workers in the field using methods well known to those skilled in the art.

Notch 1406 and point 1408 are formed as a mated pair, so that when point 1408 is inserted into notch 1406, a smooth joint is formed. The mated characteristics of notch 1406 and end 1408 facilitate the easy alignment of tubes 1402 and 1404 for welding. In a particular embodiment, notch 1406 and end 1408 are both formed at a 45 degree angle. Those skilled in the art will recognize, however, that nay other useful or advantageous pattern may be employed, so long as the tubes form a well mated joint.

Figure 15:
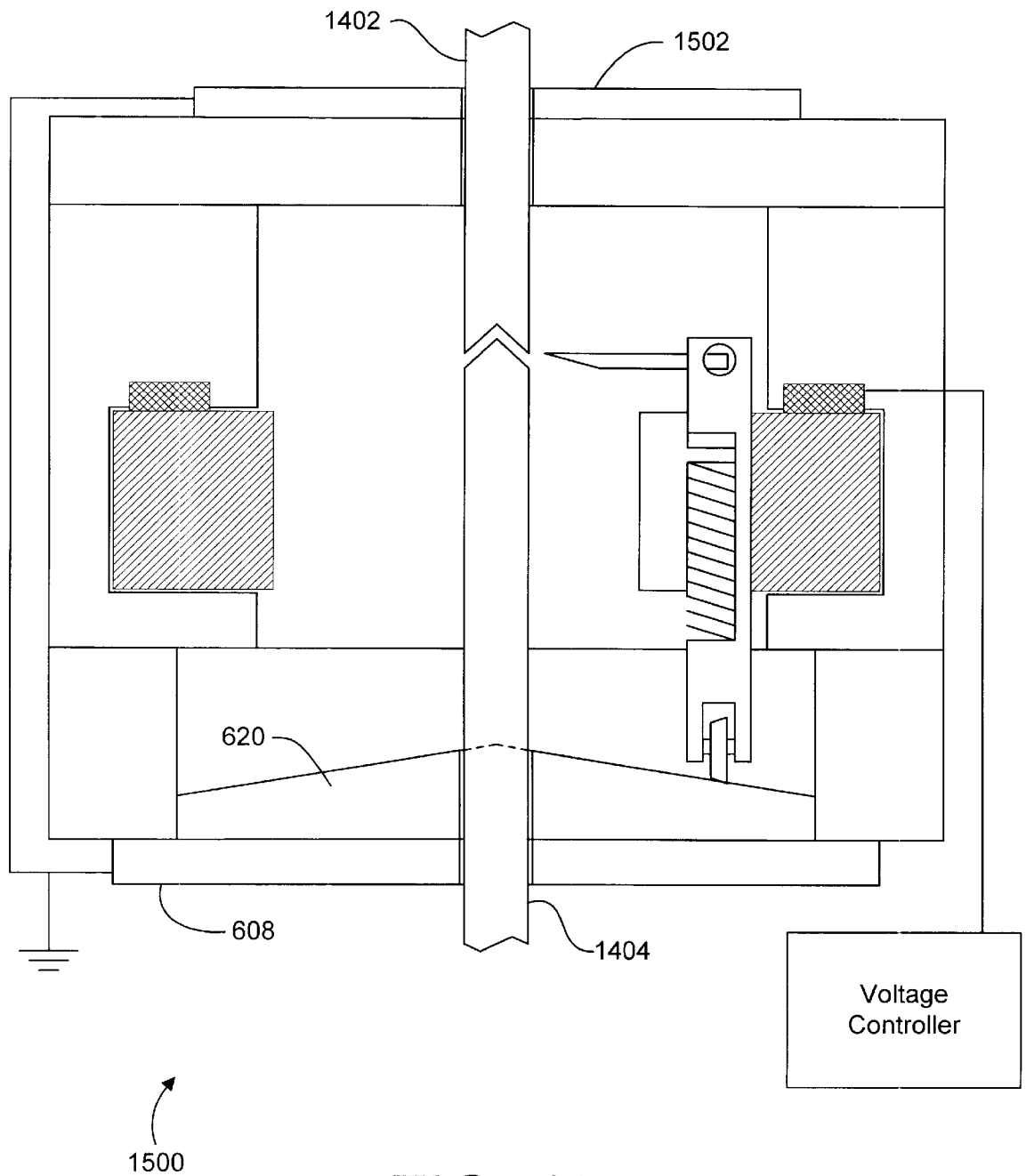
FIG. 15 is a cross-sectional view of an alternate orbital welder for forming a notched end-to-end weld, in accordance with the present invention.

FIG. 15 is a cross-sectional view of an alternate orbital welder 1500, capable of welding a notched end-to-end joint from tube pieces 1402 and 1404 of FIG. 14. Welder 1500 is substantially identical to welder 600, except that run tube clamp 604 is replaced with a second branch tube clamp 1502. Branch tube clamps 1502 and 608 hold tubes 1402 and 1404, respectively, in place for welding.

In each of the above described embodiments of the present invention, contoured cam block 620 functions as a translational controller, which controls the vertical disposition (i.e., in the longitudinal direction with respect to axis 622) of weld tip 618. Those skilled in the art will recognize, however, that many alternate translational controllers may be substituted for cam block 620.

Figure 16:
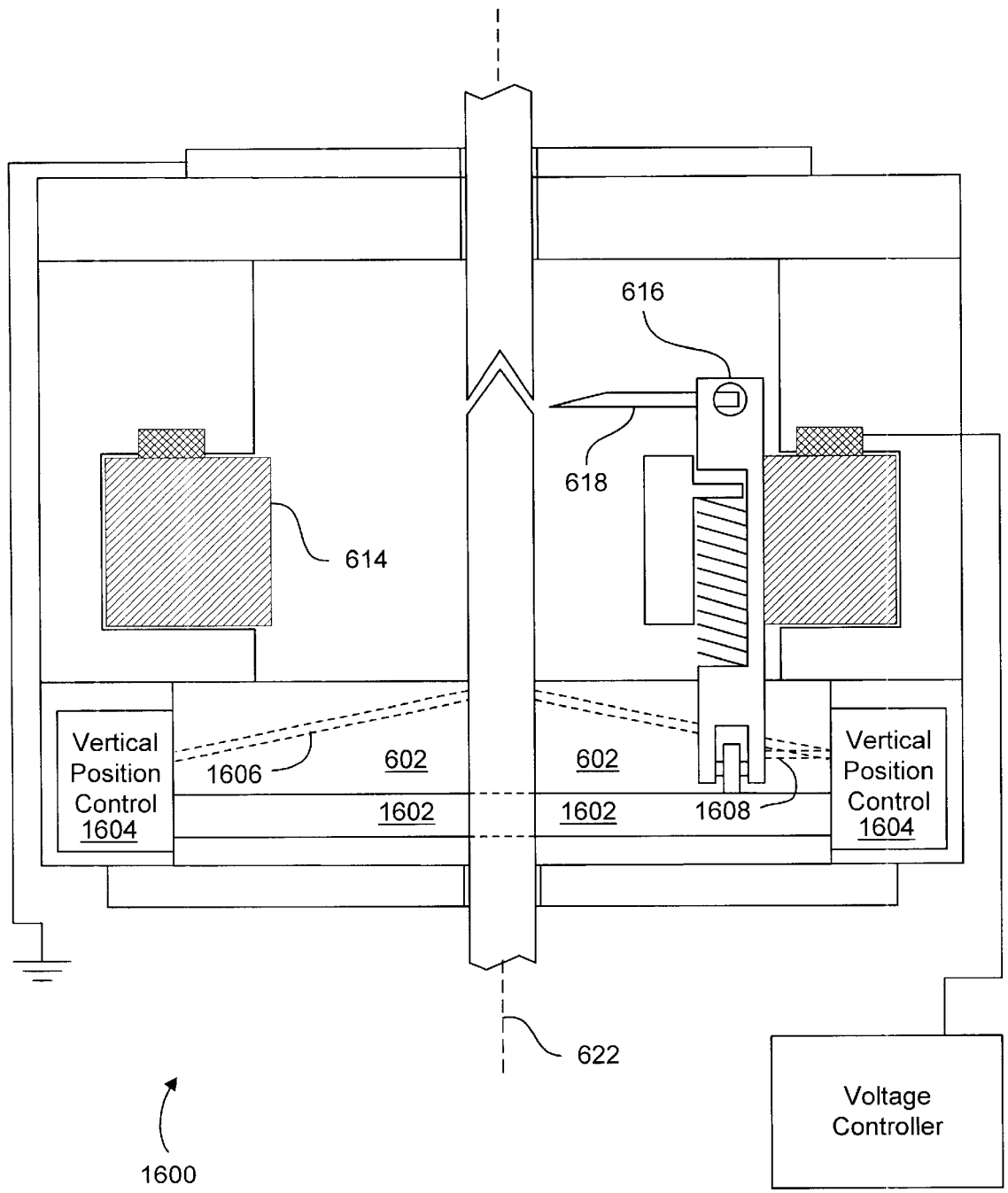
FIG. 16 is a cross-sectional view of an alternate orbital welder including an alternate vertical position controller in accordance with the present invention.

FIG. 16 is a cross sectional view of an orbital welder 1600 illustrating examples of two separate translational controllers. The first translational controller includes a flat cam block 1602, which is moveable in the longitudinal direction with respect to axis 622 by a vertical position controller 1604. Vertical position controller 1604 may be driven by a number of alternative means including, for example, mechanically, pneumatically or electronically. Those skilled in the art will understand that while vertical position controller 1604 is shown as a single block in FIG. 16, some components of vertical position controller 1604 (e.g., a stepper motor) may be located within the weld head, while other components (e.g., electronic controls for a stepper motor) may be located externally.

The second translations controller (shown in dashed lines) includes a groove 1606 formed in an interior wall of insulating body 602 and a pin 1608 extending from carrier 616 into groove 1606. As rotor 614 rotates about axis 622, pin 1608 follows groove 1606, raising and lowering carrier 616 and weld tip 618. The path of groove 1606 defines the weld pattern traced by weld tip 618. Although two examples of translational controllers are shown in FIG. 16, those skilled in the art will recognize that only one translational controller is necessary to generate a non-planar orbital weld according to the present invention.

Figure 17:
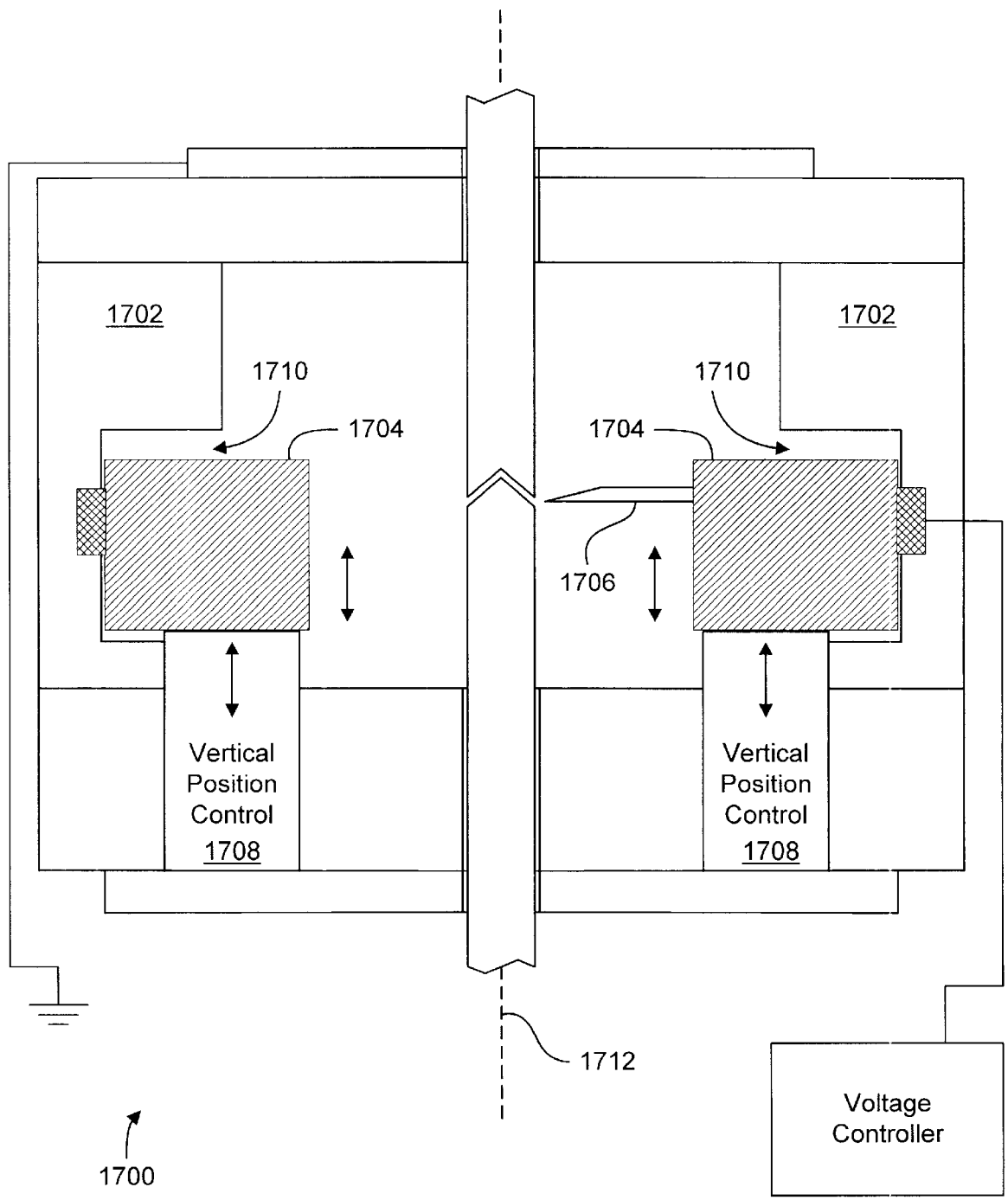
FIG. 17 is a cross-sectional view of an alternate orbital welder including a cam block moveable in the vertical direction.

FIG. 17 is a cross-sectional view of another alternate orbital welder 1700, including an insulating body 1702, a rotor 1704, a weld tip 1706, and a vertical position controller 1708. Rotor 1704 is similar to rotor 614 (FIG. 9), except that weld tip 1706 is fixed directly to rotor 1704. Carrier 616 and retaining member 624 are, therefore, unnecessary. Rotor 1704 is slidably disposed in an annular recess 1710 formed in insulating body 1702 to rotate about an axis 1712 and to move longitudinally with respect to axis 1712 within annular recess 1710.

As rotor 1704 rotates about axis 1712, vertical position controller 1708 raises and lowers rotor 1704 within recess 1710, such that weld tip 1706 traverses a non-planar orbital weld path. Thus, rotor 1704 and vertical position controller 1708 function together as a translational controller, causing weld tip to 1706 to move longitudinally with respect to axis 1712. Those skilled in the art will recognize that vertical position controller 1708 may be driven by a number of alternative means including, for example, mechanically, pneumatically or electronically.

Figure 18A:
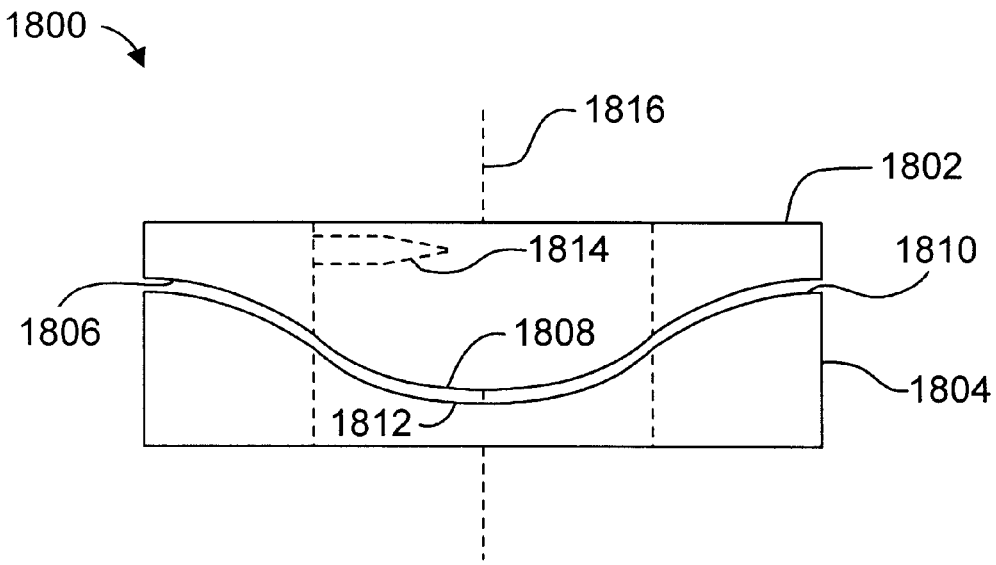
FIG. 18A is a side elevational view of an alternate translational controller in a first position.
Figure 18B:
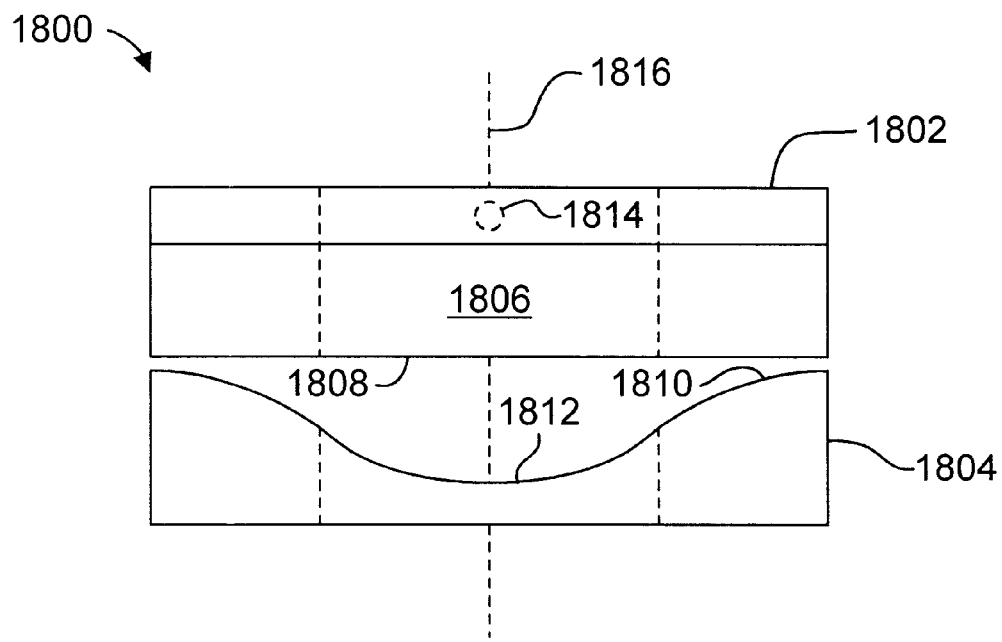
FIG. 18B is a side elevational view of the translational controller of FIG. 18A in a second position.

FIG. 18A and FIG. 18B are side elevational views of a particularly simple embodiment of a translational controller 1800, in the lowered and raised positions, respectively. Translational controller 1800 includes a rotor 1802, and a cam block 1804. Rotor 1802 has a contoured bottom surface 1806, which includes a central peak 1808. Cam block 1804 has a contoured top surface 1810, which includes a central valley 1812. A weld tip 1814 is fixed to rotor 1802 so as to extend into a cylindrical opening through the center of rotor 1802.

When rotor 1802 and cam block 1804 are oriented with respect to each other as shown in FIG. 18A, surfaces 1806 and 1810 align so that peak 1808 rests in valley 1812. When rotor 1802 and cam block 1804 are so oriented, weld tip 1814 is disposed a minimum distance from cam block 1804, corresponding to a low point in a weld pattern. As rotor 1802 rotates about an axis 1816 and cam block 1804 remains stationary, surfaces 1806 and 1810 become unaligned, and the distance between weld tip 1814 and cam block 1804 increases, until after 90 degrees of rotation, peak 1808 rest on the highest edges of cam block 1804, as shown in FIG. 18B, maximizing the distance between weld tip 1814 and cam block 1804. This position of weld tip 1814 corresponds to a high point in the weld pattern. After another 90 degrees of rotation (180 degrees total), surfaces 1806 and 1810 realign as weld tip 1814 reaches another low point in the weld pattern. After yet another 90 degrees of rotation (270 degrees total), surfaces 1806 and 1810 are again misaligned, as weld tip 1814 reaches another high point in the weld pattern. Finally, after another 90 degrees of rotation (360 degrees total), rotor 1802 and weld tip 1814 return to their original positions, completing the non-planar orbital weld pattern.

Although surfaces 1806 and 1810 are shown spaced apart in FIG. 18A and FIG. 18B, those skilled in the art will understand that those surfaces are in sliding contact during operation. Additionally, some biasing member, for example a spring (not shown), may be used to bias surfaces 1806 and 1810 together. Those skilled in the art will also recognize that although surfaces 1806 and 1810 are shown with one peak 1808 and one valley 1812, respectively, a plurality of radial peaks and valleys may be employed to generate more complicated non-planar weld patterns.

The description of particular embodiments of the present invention is now complete. Many of the described features may be substituted, altered or omitted without departing from the scope of the invention. For example, although alternate translational controllers are shown only in welders capable of forming end-to-end welds, alternate controllers may be employed in any of the orbital welders described, including those for forming T-joints and cross-joints. As another example, by modifying cover plate 630 of welder 600 (FIG. 6) to include an opening for the passage of a branch tube, welder 600 could be used to weld cross-joints by first welding a T-joint as described, and then inverting the T-joint (with the welded branch tube 610 disposed through the opening in cover plate 630) and welding another branch tube on the opposite side of run tube 606. These and other modifications, will be apparent to those skilled in the art in light of the present disclosure.

I claim:

1. An orbital welder comprising:

a weld tip;

a rotational controller for causing said weld tip to rotate about an axis, said rotational controller defining an opening to facilitate the passage of a tube to be welded; and a translational controller for causing said weld tip to move longitudinally with respect to said axis.

2. An orbital welder according to claim 1, wherein said translational controller includes a rotor slidably disposed to move longitudinally with respect to said axis, said weld tip being fixed to said rotor.

3. An orbital welder according to claim 1, wherein:

said rotational controller includes a rotor disposed to rotate about said axis; and said translational controller includes a carrier slidably attached to said rotor, said weld tip being fixed to said carrier.

4. An orbital welder according to claim 3, wherein said translational controller further comprises a cam block, a portion of said carrier being biased against a surface of said cam block as said rotor rotates about said axis.

5. An orbital welder according to claim 4, wherein said surface of said cam block is contoured according to a particular weld pattern.

6. An orbital welder according to claim 5, wherein said particular weld pattern is a notched "T" weld pattern.

7. An orbital welder according to claim 5, wherein said particular weld pattern is an oblique end-to-end weld pattern.

8. An orbital welder according to claim 5, wherein said surface of said cam block includes:
   a crest;
   a first planar portion extending from said crest; and
   a second planar portion extending from said crest, said second planar portion being non-parallel with respect to said first planar portion.

9. An orbital welder according to claim 4, wherein said cam block is mounted in said orbital welder so as to be moveable longitudinally with respect to said axis.

10. An orbital welder according to claim 9, wherein said translational controller includes mechanical means for displacing said cam block longitudinally with respect to said axis.

11. An orbital welder according to claim 9, wherein said translational controller includes electro-mechanical means for displacing said cam block longitudinally with respect to said axis.

12. An orbital welder according to claim 9, wherein said translational controller includes pneumatic means for displacing said cam block longitudinally with respect to said axis.

13. An orbital welder according to claim 4, wherein said portion of said carrier biased against said surface of said cam block includes a wheel.

14. An orbital welder according to claim 3, wherein:
   said translational controller further includes a wall defining a guide groove; and
   said carrier includes a guide pin extending into said guide groove.

15. An orbital welder comprising:
   a weld tip;
   a rotational controller for causing said weld tip to rotate about an axis; and
   a translational controller for causing said weld tip to move longitudinally with respect to said axis;
   a second weld tip;
   a second rotational controller; and
   a second translational controller.

16. An orbital welder according to claim 15, wherein:
   said translational controller includes a first rotor slidably disposed to move longitudinally with respect to said axis, said weld tip being fixed to said first rotor; and
   longitudinally with respect to said axis, said second weld tip being fixed to said second rotor.

17. An orbital welder according to claim 15, wherein:
   said rotational controller includes a first rotor disposed to rotate about said axis;
   said second rotational controller includes a second rotor disposed to rotate about said axis;
   said translational controller includes a first carrier slidably attached to said first rotor, said weld tip being fixed to said first carrier; and
   said second translational controller includes a second carrier slidably attached to said second rotor, said second weld tip being fixed to said second carrier.

18. An orbital welder according to claim 17, wherein:
   said translational controller further comprises a first cam block, a portion of said first carrier being biased against a surface of said first cam block as said first rotor rotates about said axis; and
   said second translational controller further comprises a second cam block, a portion of said second carrier being biased against a surface of said second cam block as said second rotor rotates about said axis.

19. An orbital welder according to claim 18, wherein:
   said surface of said first cam block is contoured according to a first particular weld pattern; and
   said surface of said second cam block is contoured according to a second particular weld pattern.

20. An orbital welder according to claim 19, wherein said first particular weld pattern and said second particular weld pattern together form a notched cross weld pattern.

21. An orbital welder according to claim 19, wherein:
   said surface of said first cam block includes a crest, a first planar portion extending from said crest, and a second planar portion extending from said crest, said second planar portion being non-parallel with respect to said first planar portion; and
   said surface of said second cam block includes a crest, a first planar portion extending from said crest, and a second planar portion extending from said crest, said second planar portion being non-parallel with respect to said first planar portion.

22. An orbital welder according to claim 18, wherein said first cam block and said second cam block are mounted in said orbital welder so as to be moveable longitudinally with respect to said axis.

23. An orbital welder according to claim 18, wherein said portions of said carriers biased against said surfaces of said cam blocks each include a wheel.

24. An orbital welder according to claim 17, wherein:
   said translational controller further includes a wall defining a first guide groove;
   said first carrier includes a guide pin extending into said first guide groove;
   said second translational controller further includes a wall defining a second guide groove; and
   said second carrier includes a guide pin extending into said second guide groove.

25. An orbital welder comprising:
   a weld tip;
   rotation means for causing said weld tip to rotate about an axis, said rotation means having an opening to facilitate the passage of a tube to be welded; and
   translation means for causing said weld tip to move longitudinally with respect to said axis.

26. An orbital welder according to claim 25, wherein:
   said rotation means includes a rotor disposed to rotate about said axis; and
   said translation means functions to displace said rotor longitudinally with respect to said axis.

27. An orbital welder according to claim 26, wherein:
   said rotation means includes a rotor disposed to rotate about said axis; and
   said translation means includes a carrier slidably attached to said rotor, said weld tip being fixed to said carrier.

28. An orbital welder comprising:
   a weld tip;
   rotation means for causing said weld tip to rotate about an axis;
   translation means for causing said weld tip to move longitudinally with respect to said axis;
   a second weld tip;
   second rotation means for causing said second weld tip to rotate about said axis; and
   second translation means for causing said second weld tip to move longitudinally with respect to said axis.

29. An orbital welder according to claim 28, wherein:

said translation means includes a first rotor slidably disposed to move longitudinally with respect to said axis, said weld tip being fixed to said first rotor; and said second translation means includes a second rotor slidably disposed to move longitudinally with respect to said axis, said second weld tip being fixed to said second rotor.

30. An orbital welder according to claim 28, wherein:

said rotation means includes a first rotor disposed to rotate about said axis;

said second rotation means includes a second rotor disposed to rotate about said axis;

said translation means includes a first carrier slidably attached to said first rotor, said weld tip being fixed to said first carrier; and said second translation means includes a second carrier slidably attached to said second rotor, said second weld tip being fixed to said second carrier.

31. An orbital welder comprising:

a body defining an interior chamber of said orbital welder;

a light source fixed to said body, for emitting light to illuminate said interior chamber, wherein said light source comprises an optical fiber; and a window through said body to facilitate visual inspection of said illuminated interior chamber.

32. An orbital welder comprising:

a body defining an interior chamber of said orbital welder;

a light source fixed to said body, for emitting light to illuminate said interior chamber, wherein said light source comprises a light-emitting diode; and a window through said body to facilitate visual inspection of said illuminated interior chamber.

33. An orbital welder comprising:

a body defining an interior chamber of said orbital welder;

a plurality of light sources fixed to said body, for emitting light to illuminate said interior chamber; and a window through said body to facilitate visual inspection of said illuminated interior chamber.

34. An orbital welder comprising:

a body defining an interior chamber of said orbital welder;

a light source fixed to said body, for emitting light to illuminate said interior chamber; and a window through said body to facilitate visual inspection of said illuminated interior chamber; and wherein said body includes a solid light transmitting portion for transmitting light from said light source to said interior chamber.

35. An orbital welder according to claim 34, wherein said light conducting portion comprises a layer of said body.

36. An orbital welder according to claim 35, wherein:

said light conducting portion defines an opening; and said light source is disposed in said opening.

37. An orbital welder according to claim 35, wherein:

sail light conducting portion includes an edge; and said light source is disposed adjacent said edge to emit light into said light conducting portion through said edge.

* * * * *

UNITED STATES PATENT AND TRADEMARK OFFICE
CERTIFICATE OF CORRECTION

PATENT NO. : 6,156,991  
APPLICATION NO. : 09/129598  
DATED : December 5, 2000  
INVENTOR(S) : Lorincz et al.

Page 1 of 1

It is certified that error appears in the above-identified patent and that said Letters Patent is hereby corrected as shown below:

Column 11, line 45 insert --said second translational controller includes a second rotor slidably disposed to move-- before "longitudinally with respect to said axis, said second weld tip being fixed to said second rotor."

Signed and Sealed this

Twenty-fifth Day of December, 2007

JON W. DUDAS  
*Director of the United States Patent and Trademark Office*